(12) United States Patent
Zhao et al.

(10) Patent No.: US 9,967,513 B2
(45) Date of Patent: May 8, 2018

(54) PASSWORD CONTROL FOR MULTI-ROOM DIGITAL VIDEO RECORDER

(75) Inventors: Hui Zhao, Alpharetta, GA (US); Craig Smithpeters, Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 627 days.

(21) Appl. No.: 12/724,361

(22) Filed: Mar. 15, 2010

(65) Prior Publication Data
US 2010/0235867 A1 Sep. 16, 2010

Related U.S. Application Data

(60) Provisional application No. 61/160,262, filed on Mar. 13, 2009.

(51) Int. Cl.

| | |
|---|---|
| H04N 5/765 | (2006.01) |
| G06F 21/10 | (2013.01) |
| G06F 21/57 | (2013.01) |
| G11B 20/00 | (2006.01) |
| H04L 29/06 | (2006.01) |
| H04N 7/16 | (2011.01) |
| H04N 21/433 | (2011.01) |
| H04N 21/436 | (2011.01) |
| H04N 21/475 | (2011.01) |
| H04N 5/775 | (2006.01) |

(52) U.S. Cl.
CPC ............. *H04N 5/765* (2013.01); *G06F 21/10* (2013.01); *G06F 21/57* (2013.01); *G11B 20/00086* (2013.01); *G11B 20/00152* (2013.01); *H04L 63/0846* (2013.01); *H04N 7/163* (2013.01); *H04N 21/4334* (2013.01); *H04N 21/43615* (2013.01); *H04N 21/4751* (2013.01); *H04N 21/4753* (2013.01); *H04N 5/775* (2013.01)

(58) Field of Classification Search
CPC ............. H04N 7/165; H04N 21/25875; H04N 21/43615; H04N 7/106; H04N 5/4401; H04N 21/43632; H04L 67/16; H04L 63/10; H04L 12/2876; H04L 63/20; H04L 2012/2849
See application file for complete search history.

(56) References Cited

U.S. PATENT DOCUMENTS

| | | | | |
|---|---|---|---|---|
| 5,156,027 | A | * 10/1992 | Reusch | ............................ 70/14 |
| 7,908,625 | B2 | 3/2011 | Robertson et al. | |
| 2003/0106067 | A1 | * 6/2003 | Hoskins | .............. H04L 12/2801 725/119 |

(Continued)

OTHER PUBLICATIONS

U.S. Patent Application having U.S. Appl. No. 12/724,285, filed Mar. 15, 2010.

(Continued)

*Primary Examiner* — Benjamin R Bruckart
*Assistant Examiner* — Anthony Bantamoi
(74) *Attorney, Agent, or Firm* — Benjamin A. Balser; Next IP Law Group

(57) ABSTRACT

A multi-room media network includes a network for providing device interconnectivity for receiving and sending data and a plurality of content control devices coupled to the network. Password control for multi-room digital video recorder is provided through the resetting and/or resynchronization of a password for a multi-room digital video recorder.

31 Claims, 10 Drawing Sheets

(56) References Cited

U.S. PATENT DOCUMENTS

| | | |
|---|---|---|
| 2003/0149975 A1 | 8/2003 | Eldering et al. |
| 2003/0149988 A1 | 8/2003 | Ellis et al. |
| 2004/0073941 A1* | 4/2004 | Ludvig .............. H04N 21/2355 |
| | | 725/113 |
| 2005/0203892 A1 | 9/2005 | Wesley et al. |
| 2007/0143776 A1 | 6/2007 | Russ |
| 2008/0010652 A1* | 1/2008 | Booth ................................ 725/1 |
| 2008/0126919 A1 | 5/2008 | Uskali et al. |
| 2008/0178252 A1* | 7/2008 | Michaud ........................... 726/1 |
| 2008/0301779 A1 | 12/2008 | Garg et al. |
| 2009/0260042 A1 | 10/2009 | Chiang |
| 2010/0235386 A1 | 9/2010 | Zhao et al. ................... 707/769 |
| 2010/0235869 A1 | 9/2010 | Zhao et al. ..................... 725/82 |

OTHER PUBLICATIONS

U.S. Patent Application having U.S. Appl. No. 12/724,332, filed Mar. 15, 2010.

Office Action dated Apr. 12, 2012, in co-pending U.S. Appl. No. 12/724,285.

Office Action dated Mar. 7, 2012, in co-pending U.S. Appl. No. 12/724,332.

\* cited by examiner

PASSWORD CONTROL FOR MULTI-ROOM DIGITAL VIDEO RECORDER

RELATED APPLICATIONS

This application claims the benefit of U.S. provisional application 61/160,262, filed on Mar. 13, 2009, entitled, "MULTIPLE ROOM-DIGITAL VIDEO RECORDING." This application is also related to U.S. patent application Ser. No. 12/724,332, filed on Mar. 15, 2010, entitled, "DEVICE MANAGEMENT FOR MEDIA NETWORK," and U.S. patent application Ser. No. 12/724,285, filed on Mar. 15, 2010, entitled, "MULTI-USER FILE SYSTEM FOR MULTI-ROOM DIGITAL VIDEO RECORDING."The aforementioned are incorporated herein by reference.

FIELD OF THE INVENTION

This disclosure relates in general to the digital recording of content, and more particularly to multiple room-digital video recording.

BACKGROUND

Over the past few years, multi-service broadband communications companies have invested heavily in developing and improving on the delivery infrastructure. For example, the U.S. cable industry has made fiber optics a centerpiece of a massive, multi-billion dollar investment program that has brought new capabilities to millions of cable customers. As a result, cable customers are able to connect to a high-capacity network that is powered by fiber-optic transmission lines. The investment in fiber optic lines has allowed cable companies to introduce increasing sophisticated services and equipment, i.e., set-top boxes (STB). Such services include Internet services, digital and high-definition television, On Demand TV, digital phone services and more.

In addition, over the past three decades, various U.S. satellite services have come and gone or combined. Satellite television is television delivered from ground stations to communications satellites wherein the signal is relayed to a satellite dish and set-top box of a subscriber.

Spurred initially by demand for broadband Internet service, operators have more recently recognized that the enhanced bandwidth and increased reliability of their networks would lend themselves to delivery of an even greater array of value added, revenue generating consumer services. Recently, digital video recorders (DVRs) have enabled subscribers to take control of their television.

A DVR is a device that records video in a digital format. Such devices may be implemented in stand-alone set-top boxes, portable media players (PMP) and software for personal computers which enables video capture and playback. DVRs make the "time shifting" feature (traditionally done by a VCR) much more convenient, and also allow for "trick modes" such as pausing live TV, instant replay of interesting scenes, and chasing playback where a recording can be viewed before it has been completed. Most DVRs use the MPEG format for compressing the digitized video signals.

Equipment manufactures continue to add features to DVRs that will make it easier to watch TV shows when you want to, plus make the whole experience more active. Furthermore, self-contained data networks are increasingly common in new homes and they are readily deployable in others via off-the-shelf, consumer-friendly solutions. That availability has many consumers interested in new ways of using their media throughout their home such as listening to the music stored on their PC via their home audio system, viewing video and photos stored on their PC on any TV in their home, or watching video stored on their DVR system on a laptop in another room.

Consumers crave having their content freed from the limitations of place, enabling uninterrupted, consistent content-driven services regardless of location. However, consumers are unable to use their existing technology to locate content while surfing the web, pause playback, then continue viewing the content via their set top box on their television, and then pause again and complete the experience in yet another location. Further, content maintained on a consumer's DVR located in a living room is not accessible to any other set top box or PC located throughout the home.

Thus, it can be seen then that there is a need for a system, method and computer-readable media that provides password control for multi-room digital video recording.

SUMMARY OF THE INVENTION

To overcome the limitations described above, and to overcome other limitations that will become apparent upon reading and understanding the present specification, embodiments for providing password control for multi-room digital video recorder are disclosed.

The above-described problems are solved by providing for resetting and/or resynchronization of a password for a multi-room digital video recorder.

An embodiment includes a multi-room digital video recorder (MR-DVR) that includes memory for storing data and a processor, coupled to the memory, for providing capture and presentation of content, the processor provisioning an interface for managing a network control parameter for controlling device access, the interface providing communication with additional MR-DVRs to coordinate management of the network control parameter between the MR-DVRs.

In another embodiment, a multi-room media network is provided. The multi-room media network includes a network for providing device interconnectivity for receiving and sending data and a plurality of content control devices coupled to the network, wherein the plurality of content control devices include a multi-room digital video recorder (MR-DVR) for providing for capture and presentation of content received by the network and at least one non-DVR device, coupled to the MR-DVR, the at least one non-DVR device configured to communicate with the MR-DVR, wherein at least one non-DVR device includes a reset interface for resetting a control parameter on the at least one non-DVR to a default value, the MR-DVR includes a reset interface for resetting a control parameter on the MR-DVR and for resetting any at least one non-DVR device in communication with the MR-DVR to a default value, the MR-DVR further including a resynchronization interface for initiating a setting of the control parameter on the MR-DVR and the at least one non-DVR to a new value after the control parameter for the MR-DVR and the at least one non-DVR have been reset.

In another embodiment, a method for providing a multi-room media network is provided. The method includes providing a network for establishing device interconnectivity for receiving and sending data, providing a plurality of content control devices coupled to the network, wherein the providing a plurality of content control devices include providing a multi-room digital video recorder (MR-DVR) to capture and present content received by the network and providing at least one non-DVR device coupled to the MR-DVR to communicate with the MR-DVR, providing the plurality of content control devices with a reset interface for resetting a control parameter on the at least one non-DVR to a default value and providing the MR-DVR a resynchronization interface for initiating a setting of the control parameter on the plurality of content control devices after the control parameter for the content control devices have been reset.

A computer-readable medium having stored thereon computer-executable instructions for implementing a multi-room media network is disclosed. The computer-executable instructions, when executed by a computer, cause the computer to establish a network for establishing device interconnectivity for receiving and sending data, configure a plurality of content control devices coupled to the network, wherein the providing a plurality of content control devices include configuring a multi-room digital video recorder (MR-DVR) to capture and present content received by the network and configuring at least one non-DVR device coupled to the MR-DVR to communicate with the MR-DVR, create a reset interface for the plurality of content control devices for resetting a control parameter on the at least one non-DVR to a default value and create a resynchronization interface for the MR-DVR for initiating a setting of the control parameter on the plurality of content control devices after the control parameter for the content control devices have been reset.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed providing password control for multi-room digital video recorder. The password control provides for resetting and/or resynchronization of a password for a multi-room digital video recorder.

Figure 1:
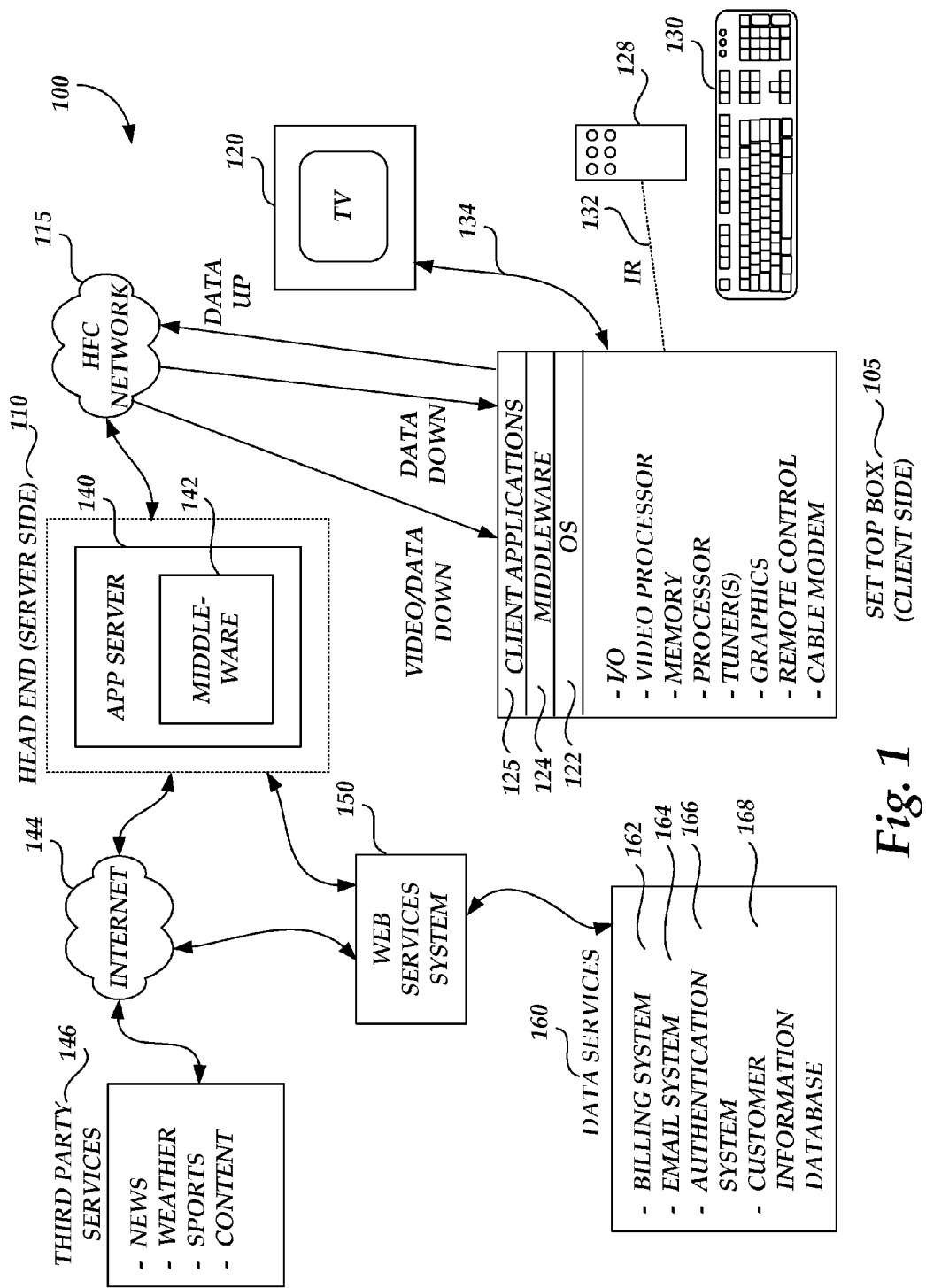
FIG. 1 is a simplified block diagram illustrating a cable television/services system architecture that serves as an exemplary operating environment for the present invention.

FIG. 1 is a simplified block diagram illustrating a cable television/services system 100 (hereafter referred to as "CATV") architecture that serves as an exemplary operating environment for the present invention. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modem CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including, but not limited to, digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 144 for transmitting to a customer through the HFC network 115 and the set-top box 105. For example, a weather report from a third-party weather service may bedownloaded by the application server via the Internet 144. When the application server 140 receives the downloaded weather report, the middleware layer 142 may be utilized to format the weather report for receipt and use by the set-top box 105.

According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 11 5 and the set-top box 105.

According to embodiments of the present invention, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

An electronic mail system 164 may contain information such as electronic mail addresses, high-speed Internet access subscription information and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
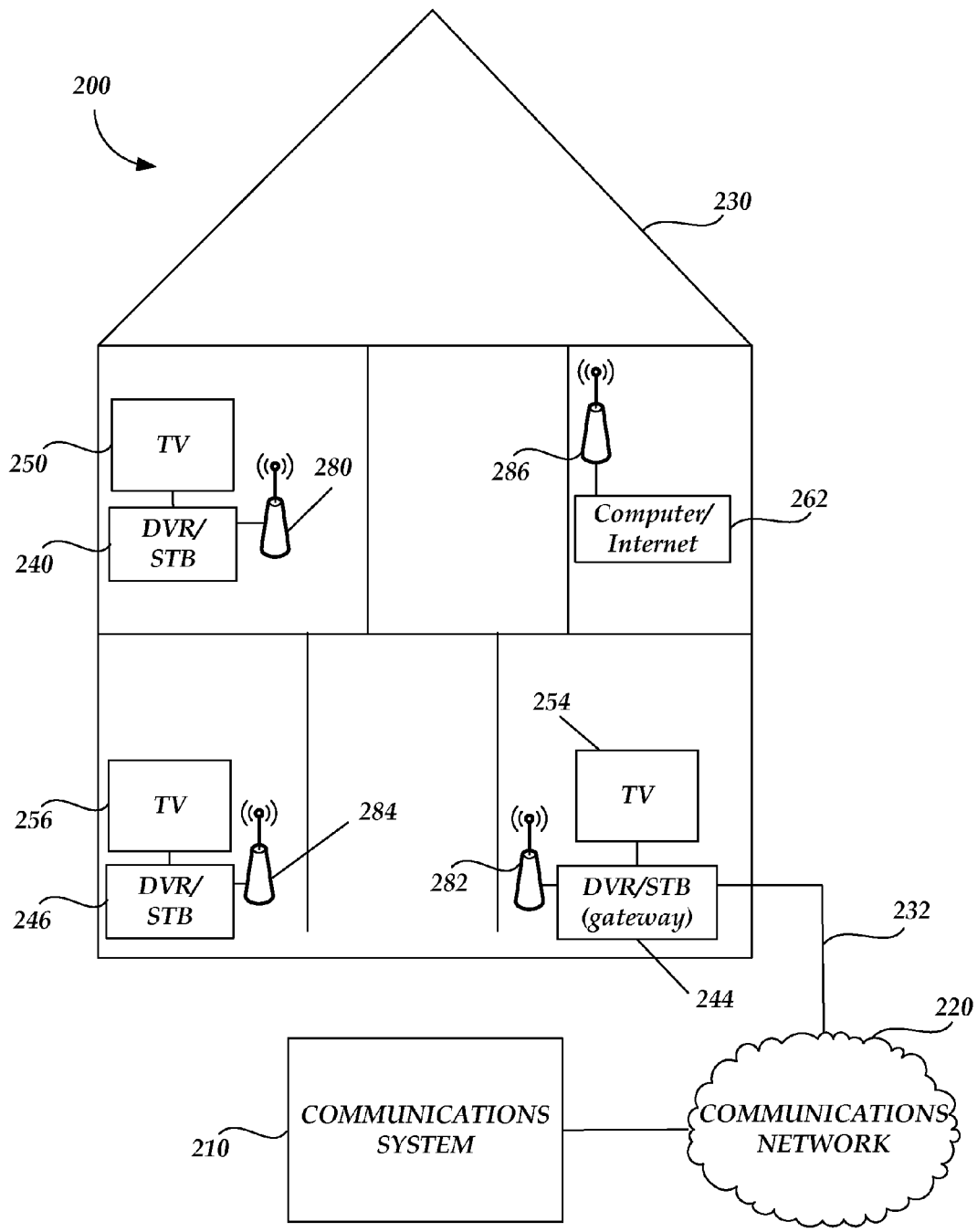
FIG. 2 is a diagram of a home having MR-DVR boxes according to an embodiment of the invention.
Figure 4:
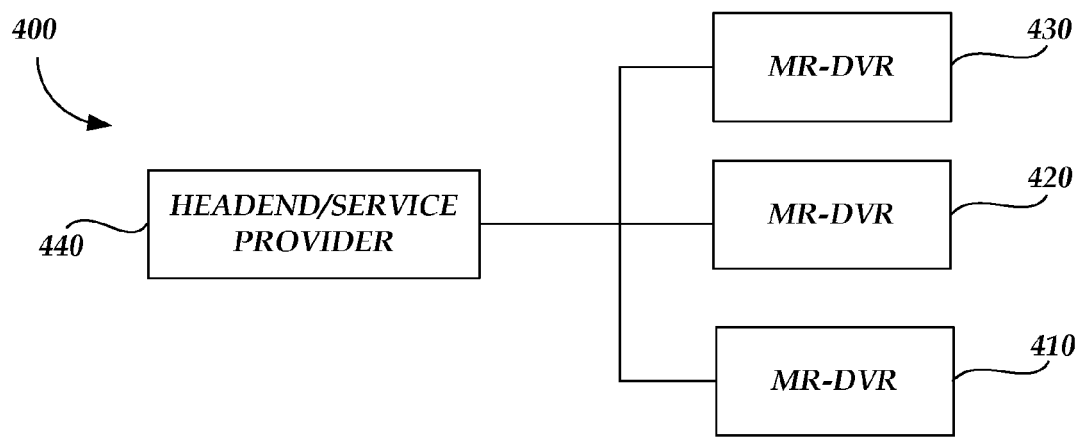
FIG. 4 illustrates a first configuration of MR-DVRs according to one embodiment of the invention.
Figure 5:
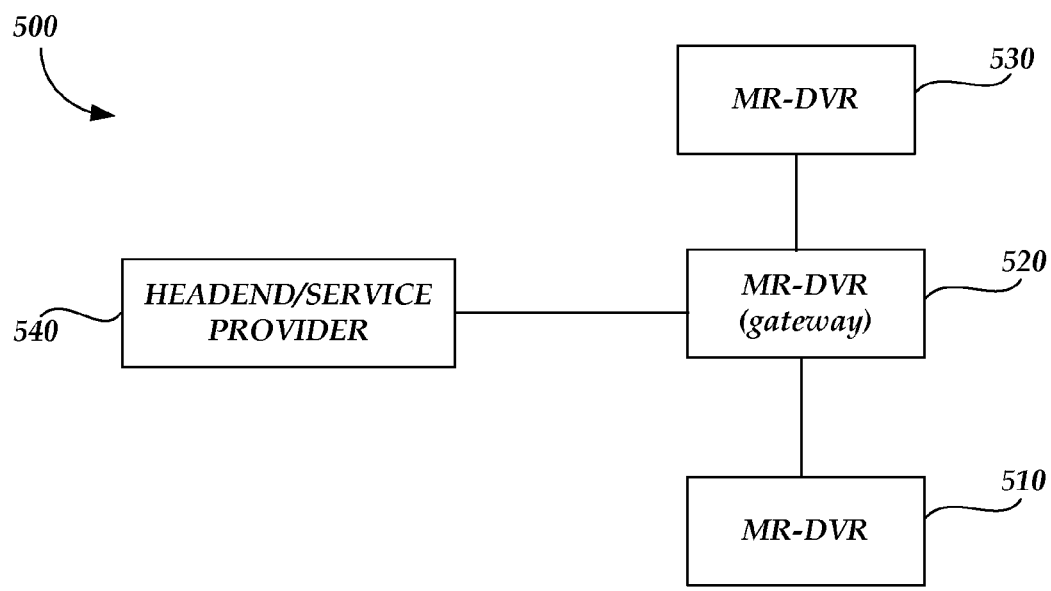
FIG. 5 illustrates a second configuration of MR-DVRs according to an embodiment of the invention.

FIG. 2 is a diagram 200 of a home having MR-DVR boxes according to an embodiment of the invention. In FIG. 2 a communications system 210 provides content to a communications network 220 for delivery of content to subscribers. One such subscriber may be a single-family residence, an apartment complex, a condominium complex, etc. In FIG. 2, a single-family residence 230 is shown coupled to the communications network 220. Content is provided to the single-family residence 230 via signal path 232. A single-family residence 230 may include several content control devices, such as DVRs/STBs 240, 244, 246, for processing content signals delivered to the single-family residence 230 via signal path 232 and for recording such content. Signal path 232 is coupled to DVR/STB 244. DVRs/STBs 240, 246 are coupled to the home network by wireless device 280, 284, respectively. Computer 262 is coupled to the home network via wireless device 286. DVR/STB 244 may act as a gateway, via wireless device 282 for the other devices, e.g., DVRs/STBs 240, 246 and computer 262. However, the devices may be configured in alternate configurations, such as illustrated in FIGS. 4-5 below. The wireless devices 280, 282, 284, 286 may be external or internal devices and may be integrated into the device using the connectivity provided by the wireless devices.

Figure 3:
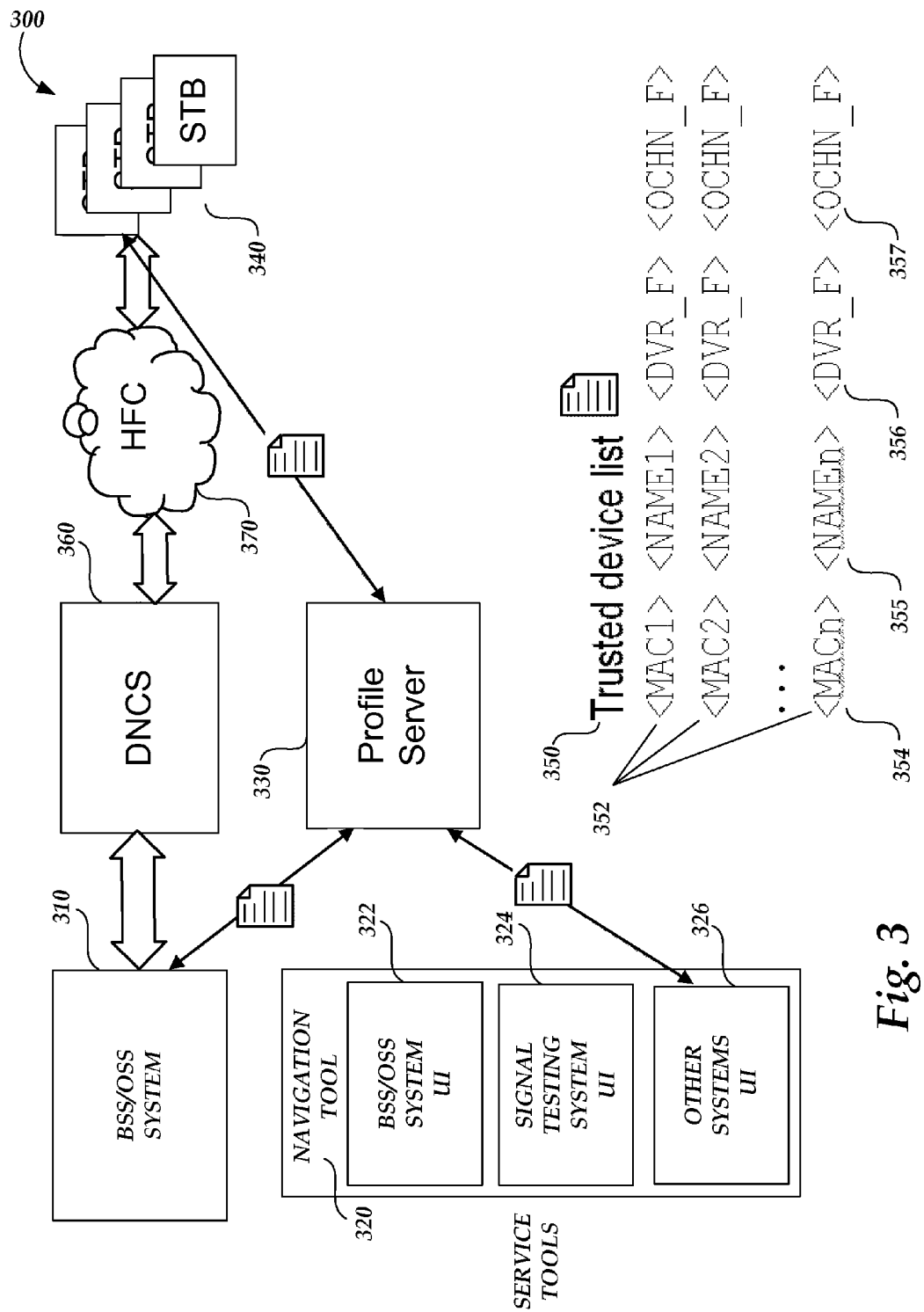
FIG. 3 is a block diagram showing the operation of the MR-DVR STBs according to an embodiment of the invention.

FIG. 3 is a block diagram 300 showing the operation of the MR-DVR STBs according to an embodiment of the invention. In FIG. 3, a Business and Operations Support System (BSS/OSS) 310, such as Infinys® ICOMS provided Convergys, provides subscriber account management. A Digital Network Control System (DNCS) 360 is provided between the BSS/OSS 310 and the hybrid fiber coax network 370. The DNCS 360 provides management, monitoring, and control of the network's elements, including the STBs 340, and broadcast services provided to subscribers.

The BSS/OSS 310 maintains subscribers' information in a database that is accessible via, for example, a navigation tool 320. The navigation tool may include several user interfaces, such as a BSS/OSS UI 322, a signal testing system UI 324, other systems UIs 326. The interfaces provide service tools for service representatives to use during installation and maintenance activities.

Profile server 330 is configured to communicate with the navigation tool 320, BSS/OSS 310 and STBs 340. Communication may be implemented using socket connections. The profile server 330 supports the setting of control parameters, such as multi-passwords, and maintains the trusted rights list 350 for the STBs 340. Those of ordinary skilled in the art will understand that passwords are just one example of a control parameter and that other types of control parameters may be utilized. The trusted rights list 350 will include information received from business data generating modules, such as a profile service, a billing system, etc. The trusted rights list is heavily dependent on the headend, but the dependency may be configurable. Nevertheless, any source can deliver the trusted rights list to the set-top box once obtained from the profile server 330. Profile server 330 is designed to keep provisioning information for a simple, consistent, intuitive navigation (SCIN) application on each STB 340. The SCIN application may be configured to allow subscribers to navigate data stored on a MR-DVR using just the up, down, left, right and A-B-C buttons on a remote. Data stored on a MR-DVR may include linear programming, video-on-demand (VOD) programming and content subscribers may have stored on a DVR. The trusted device list stored in the profile server 330 and in the DVR must be synchronized. Further, the trusted device list that is transferred between the profile server 330 and the DVR is encrypted.

A basic MR-DVR home network provisioning configuration includes one MR-DVR network, wherein STBs that belong to the MR-DVR network must be explicitly specified. Other devices are not allowed to access the network, even if the other devices are MoCA and UPnP capable. Multimedia over Coax Alliance (MoCA) provides standards to facilitate home networking on existing high speed coaxial cable. Cable meeting the standards can be used for data connections to televisions, set-top boxes, and other entertainment devices without the need for new connections. The goal is to be able to distribute high-quality multimedia content and high-speed data with high throughput. Universal Plug and Play (UPnP) is a set of networking protocols that allow devices to connect seamlessly and to simplify the implementation of networks in the home (data sharing, communications, and entertainment) and in corporate environments for simplified installation of computer components. UPnP achieves this by using UPnP device control protocols (DCP) built upon open, Internet-based communication standards.

STBs 340 belonging to one MR-DVR network can only be specified after physical installation in customer's home. In FIG. 3, STBs 340 represent both MR-DVRs and non-DVRs. Service representatives are able to enable/disable MR-DVR features from the headend. Further, a service representative is able to enable/disable a connection from a specific STB 340 to a DVR host. Only one DVR is allowed in the MR-DVR network basic configuration.

The trusted device list 350 is a text file that uses a simple format to manage the MR-DVRs. There may be multiple lines 352, wherein each line stands for one STB 340 installed in the household, whether or not they belong to the MR-DVR network. Four fields 354-357, which are separated with whitespace, are provided in each line 352. The first field 354 is the RF MAC address of a STB 340. The second field 355 is the readable name of the STB. The third field 356, <DVR_F>, is a Boolean type, wherein true means this line keeps information of a DVR box and false means this line keeps information of a non-DVR box. The fourth field 357, <OCHN_F>, is a Boolean type, wherein true means this STB 340 belongs to the network and false means the STB 340 is a standalone box.

The profile server 330, along with the trusted device list 350, is used to manage all possible configuration scenarios. When a MR-DVR is initially installed, e.g., one MR-DVR box and two non-DVR boxes, the service representative is dispatched. The service representative may be carrying many MR-DVR boxes and non-DVR boxes. The service representative certifies the home using handheld MoCA test equipment to make sure the physical connections match the required home network specifications. The service representative installs one MR-DVR box and two non-DVR boxes and calls a representative at the central office with the MAC addresses of three boxes, including identification of the MAC address of the DVR box. The representative at the central office access the BSS/OSS system 310 and profile server 330 via the navigation tools 320 to create the trusted device list 350 that is maintained on the profile server 330. The field service representative boots the DVR, which pulls the trusted device list 350 from the profile server 330. The MR-DVR boots up and checks a flag in the trusted device list to determine whether the MR-DVR is allowed into network mode; otherwise the MR-DVR is configured in isolated mode. Next, the non-DVRs are booted up. The non-DVRs talk to the MR-DVR in UPnP device discovery mode using its MAC address as an ID. The MR-DVR searches the stored trusted device list using the MAC address. If the MR-DVR finds the item, and the flag is set appropriately, the MR-DVR grants access from the non-DVR.

When a customer changes the default name of each STB 340, the customer uses the SCIN UI on a non-DVR to change the name of the specific STB 340. A name change message is sent from the non-DVR to the MR-DVR. Using MAC address, the MR-DVR finds the appropriate line in the trusted device list 350 and changes the name field. The DVR pushes back the trusted device list 350 to the profile server 330. A service representative at the central office accesses the customer account using the navigation tools 320. The service representative at the central office pulls the name 355 of the new STB 340 from the profile server 330 associated with its MAC address 354.

To eliminate one non-DVR from the MR-DVR network, a service representative at the central office set the appropriate flag on the non-DVR to false and saves the setting back in the profile server 330. The profile server 330 pushes the trusted device list 350 to the MR-DVR in the same household and the MR-DVR shuts down communication with the eliminated STB 340.

To disable the MR-DVR network, the service representative at the central office sets the appropriate flag of the MR-DVR to false and saves the setting back in the profile server 330. The profile server 330 pushes the trusted device list 350 to the MR-DVR in the same household. The MR-DVR sees its own flag set to false and disables all MR-DVR networking activities.

Many computers may be configured to be Digital Living Network Alliance® (DLNA) certified and UPnP capable. A MoCA dongle may be installed on a computer so that computer can talk to a MR-DVR in UPnP messages. A computer with a MoCA dongle may be block from having access because the MR-DVR can see the computers request, but the DVR can determine that the computer is not in the trusted device list and thus the MR-DVR will not grant a connection requests from it.

To support extensibility to multiple DVRs, multiple lines may be provided for the MR-DVRs in the trusted device list. To support additional digital right management (DRM), more columns can be added to the trusted device list to support fine grained DRM schemes.

FIG. 4 illustrates a first configuration of MR-DVRs 400 according to one embodiment of the invention. In FIG. 4, the MR-DVRs 410, 420, 430 are setup in a flat model where each MR-DVR 410, 420, 430 is connected to the headend 440 and each of the MR-DVRs 410, 420, 430 is treated as a unique set-top box.

FIG. 5 illustrates a second configuration of MR-DVRs 500 according to an embodiment of the invention. In FIG. 5, MR-DVRs 510, 520, 530 are setup so that one MR-DVR 520 acts as a gateway. In both FIG. 4 and FIG. 5, premium content may pass through each of the MR-DVRs. In the gateway model of FIG. 5, the gateway MR-DVR 520 manages the home networking MR-DVR2 510, 530 with all the feature provisioning that goes through the gateway MR-DVR 520. In addition to the unique ID associated with each MR-DVR 510, 520, 530, each is given a user friendly name to identify each set-top box in the home network.

Figure 6:
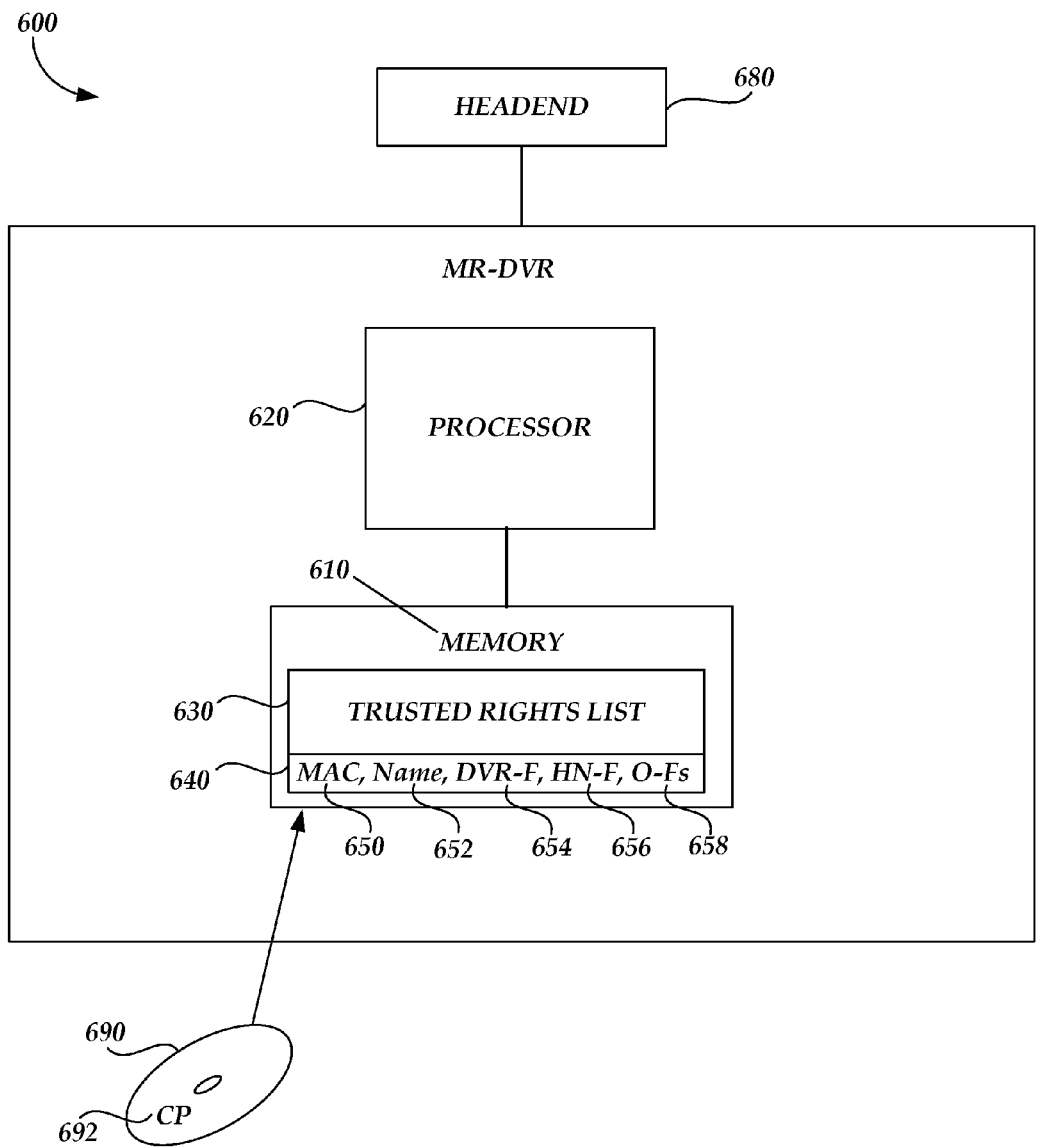
FIG. 6 illustrates a STB, such as a MR-DVR having memory for storing a trusted rights list according to an embodiment of the invention.

FIG. 6 illustrates a STB, such as a MR-DVR 600, having memory for storing a trusted rights list according to an embodiment of the invention. In FIG. 6, a MR-DVR 600 is coupled to a headend 680 for receiving content therefrom. In the MR-DVR, the memory 610 of the MR-DVR 600 is in communication with processor 620. The memory 610 includes the trusted rights list 630. The trusted rights list 630 maintains data 640 for the MR-DVR, such as flags and values may be provided in each line of the trusted rights list 630. The MAC address 650 of the MR-DVR and the name 652 selected for the MR-DVR are examples of some of the types of data 640 that may be maintained in the trusted rights list 630. A DVR flag 654 may be set to identify the device as a MR-DVR and home network flag 656 may be set to identify that the DVR belongs to the home network. Additional other fields 658 may also be provided. Accordingly, any features that are relevant to home networking are extendable through the trusted rights list. For example, if a STB 600 is used as storage for storing computer files of the subscriber, and the subscriber wants to play MP3s from the computer, this set of features can be extended to the trusted rights list 630. If a STB 600 is allowed to access the content from any third party device, such features may be extended through the trusted rights list 630. Accordingly, features may be passed based on a field until constrained by the trusted rights list 630. For minor use cases, the configuration is very straightforward. For example, the subscriber can change the default name 652 of the device 600. The subscriber can also change certain fields that do not affect the billing code. Thus, the trusted rights list 630 provides the user the authority to change certain fields. However, most fields will probably be blocked to prevent the subscriber from changing certain features. The subscriber has access to only what is exposed to them through the user interface application, which is controlled by the service provider. The subscribers will not be able to upload their own application to the STB 600. Thus, all applications running on the STB 600 may be controlled solely by the service provider, even though additional features may be provided, such as playing MP3s on the home computer.

The trusted rights list 630 is used to support the multi-room DVR functionality. The MR-DVR 600 may be treated as the gateway of the home network based on the configuration of the trusted rights list 630. The home network is implemented as a self matched domain and is dependent on the headend 680. However, the subscriber has many features that can be managed from the subscriber end. For example, the subscriber may decide when to record a program. Even if the connection to the headend 680 is temporarily lost, the subscriber is still authorized to access recordings on the MR-DVR 600. The data 640 of the trusted rights list 630 provides this capability to the subscriber and thus provides a stand alone management model.

Embodiments may also be implemented in combination with computer systems and program modules. Generally, program modules include routines, programs, components, data structures, and other types of structures that perform particular tasks or implement particular abstract data types. By way of example, computer readable media 690 can include computer storage media or other tangible media. Computer storage media 690 includes volatile and nonvolatile, removable and non-removable media implemented in any method or technology for storage of information 692, such as computer readable instructions, data structures, program modules or other data. Moreover, those skilled in the art will appreciate that the invention may be practiced with other computer system configurations, including handheld devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 690 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 690 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 620 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules.

It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 610 thus may store the computer-executable instructions that, when executed by processor 620, cause the processor 620 to implement a system as illustrated elsewhere in this detailed description of embodiments. However, memory 610 may also be configured to provide the trusted device list 630, which is processed by processor 620.

Figure 7:
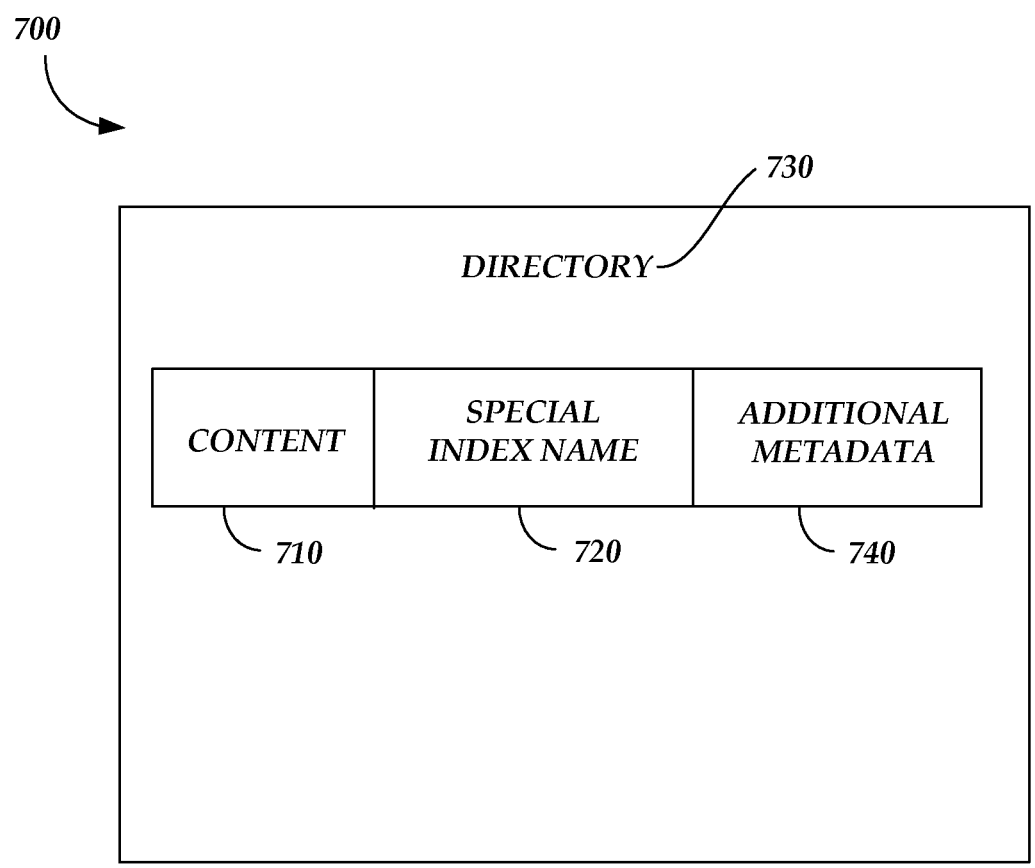
FIG. 7 illustrates a file that is stored for each recording on a DVR according to an embodiment of the invention.

FIG. 7 illustrates a file 700 that is stored for each recording on a DVR according to an embodiment of the invention. The recordings are organized in a linear structure to enhance performance. Every recording has a content field 710 and a special index name 720. The special index name 720 is stored in the hard drive directory 730. Those skilled in the art will recognize that FIG. 7 shows a linear field of data, but will understand that the present invention is not meant to be limited to such a configuration. Additional data structures and configurations may be implemented without departing from the scope of the present invention. For example, the metadata may be a link to separate data fields, the metadata may be non-contiguous with the special index name, etc. Nevertheless, providing support for a multi-user environment is important because there are typically many users in a home want access, and each of these users has different interests, different favorite ratings, and bookmarks that may be associated with their user profile. Further each of these users share the content. However, if every one records the same content on the hard drive multiple times, space will be exhausted. Thus, the content 710 and metadata 740 must be managed to optimize the support of multiple users. Metadata may include user profile folders. The content 710 is stored in a linear format and stack layer metadata 740 is also linked to the content 710 to provide searchable information. However, such information does not support a user profile or multiple users. Thus, a file is configured with additional folders. Links in each user folder show recording of content 710.

Figure 8:
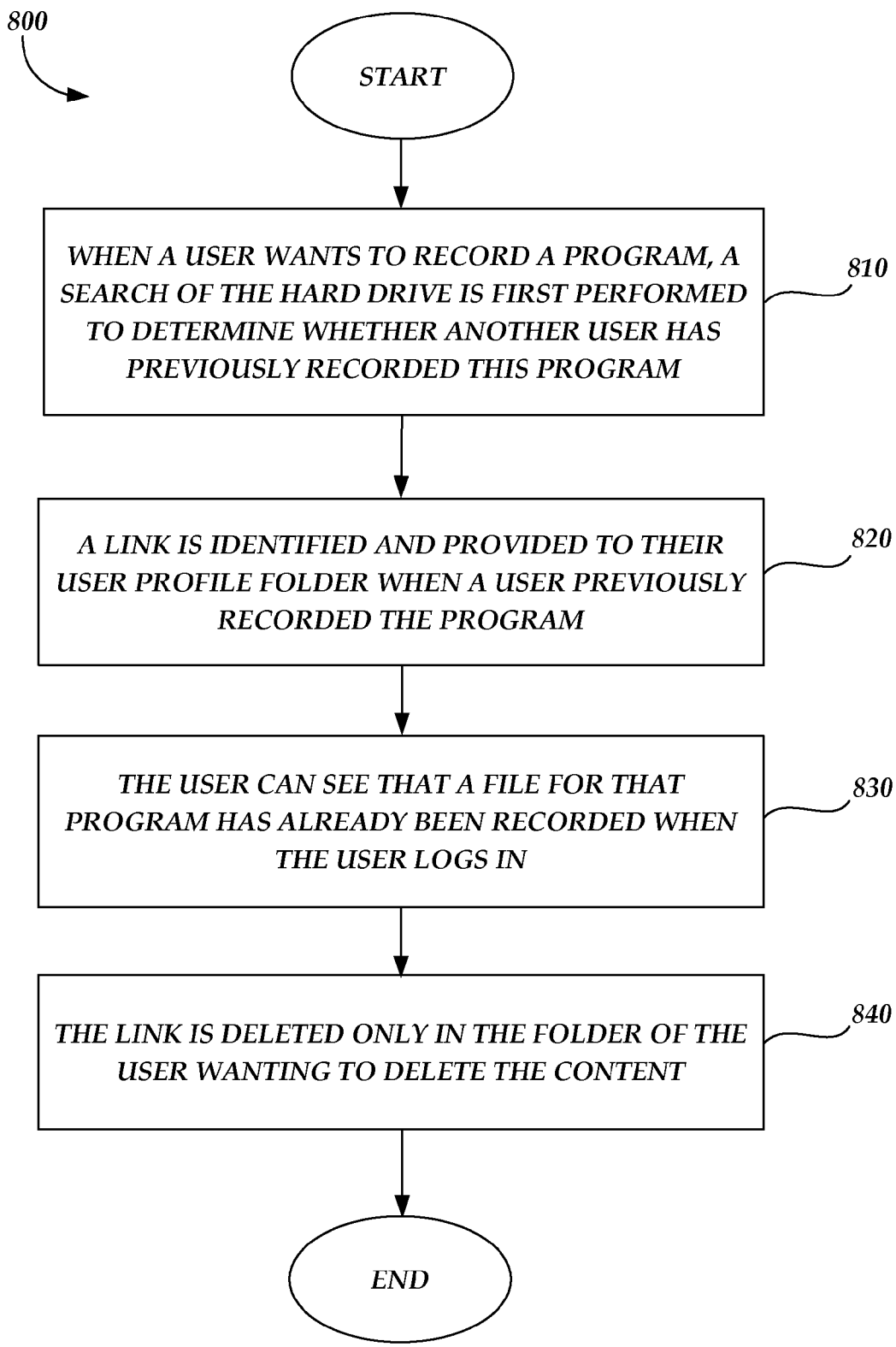
FIG. 8 is a flow chart of a process for recording programs in a MR-DVR environment according to an embodiment of the invention.

FIG. 8 is a flow chart 800 of a process for recording programs in a MR-DVR environment according to an embodiment of the invention. When a user wants to record a program, a search of the hard drive is first performed to determine whether another user has previously recorded this program 810. If a user previously recorded the program, a link is identified and provided to their user profile folder 820. When the user logs in, the user can see that a file for that program has already been recorded 830. Then, if the user wants to delete the recording, rather than comparing every user to determine whether the content is to be maintained, the link is deleted only in the folder of the user wanting to delete the content 840.

Performing global searches also present a challenge. For example, if the user wants to perform a global search, the search not only looks at that user's profile, but also searches across the whole storage system. This kind of search criteria is very complex. Therefore, the hierarchy of the structure will be complex under each user. Accordingly, a two directory structure may be used.

Figure 9:
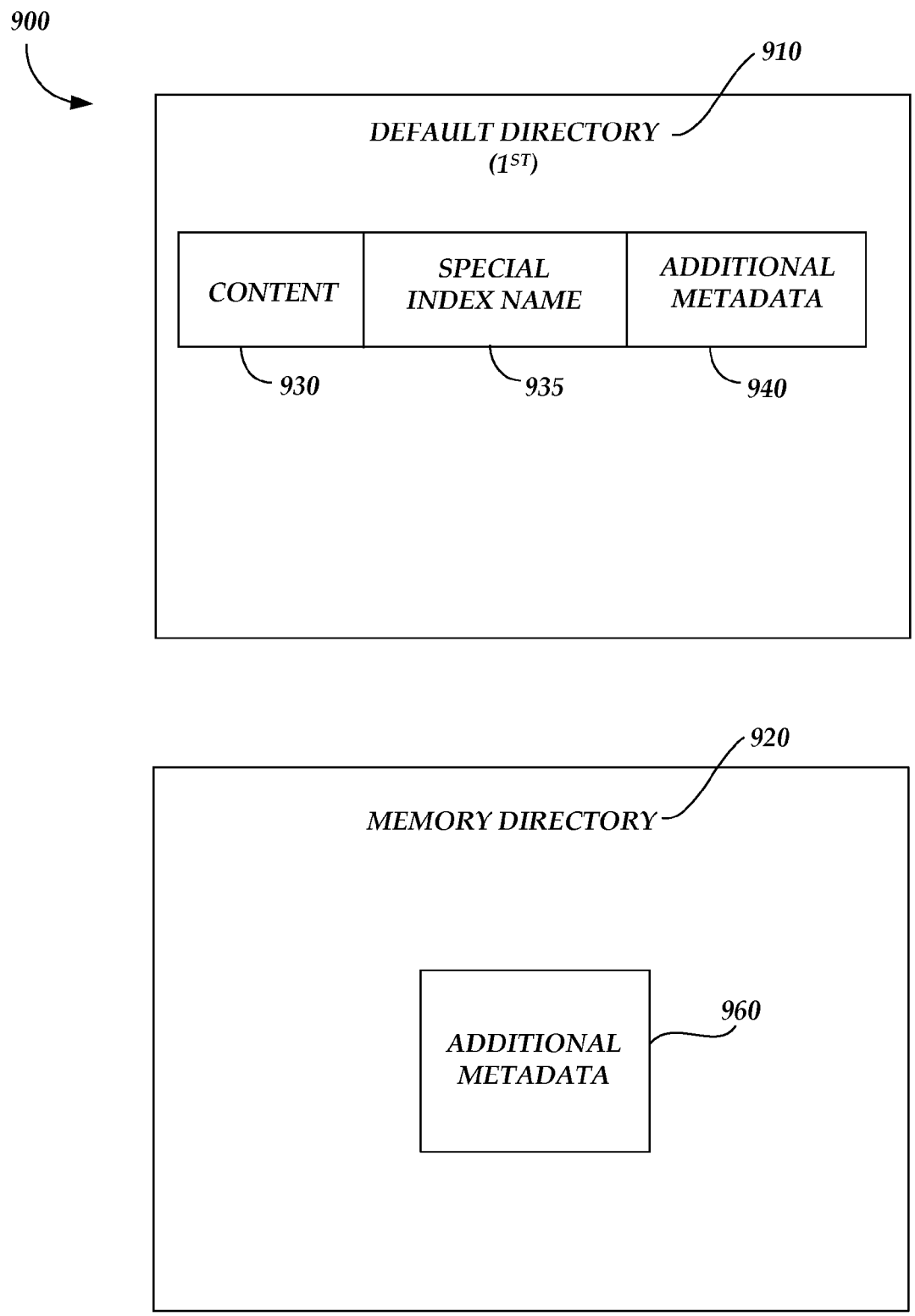
FIG. 9 illustrates a dual directory structure according to an embodiment of the invention.

FIG. 9 illustrates a dual directory structure 900 according to an embodiment of the invention. A first directory is the default directory 910 that is stored in the hard drive of the MR-DVR. The second directory 920 is generated upon bootup and is stored in memory. The memory directory 920 is used to help improve the performance of the global search.

The memory directory 920 only includes metadata, not program content because there is limited storage space. The metadata 960 in the memory directory 920 is arranged in a different structure than the structure used in the default directory 910 in the hard drive. The format of the default directory 910 supports one kind of search. A user may thus browse the contents that that user is interested in by accessing only the directory of that user on the hard drive. The default directory 910 includes a content field 930, a special index name 935 and metadata 940. However, when a user wants to perform a global search, the memory directory 920 is checked.

In a home network, a control parameter, such as a password, may be used as a mechanism to isolate each layer, e.g., the link layer, network layer, the physical layer, etc. in the seven layers of an OSI modem. Multiple password setting involves the use of multiple passwords, e.g., for different users, in the home network. Multimedia over Coax Alliance (MoCA®) is the enabling technology to provide multiple password setting, as well as other features that may be discussed herein. As discussed above, MoCA® is an open, industry driven initiative that is targeted at the cable industry to support home networking by promoting distribution of digital video and entertainment through existing coaxial cable in the home.

Figure 10:
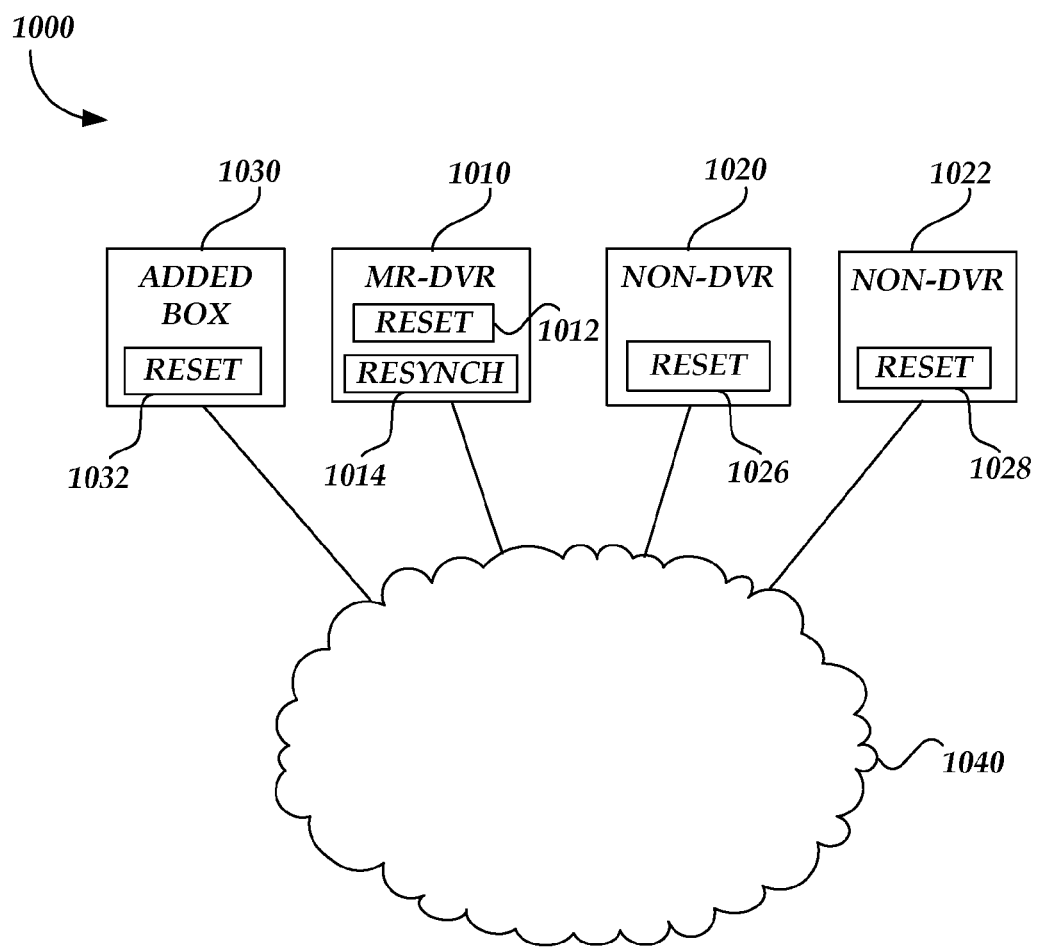
FIG. 10 is a block diagram of a MR-DVR network according to an embodiment of the invention.

FIG. 10 is a block diagram of a MR-DVR network 1000 according to an embodiment of the invention. In FIG. 10, the management of the MR-DVR network 1000 will be described. FIG. 10 shows a network having an MR-DVRs 1010 and non-DVR STBs 1020, 1022. During a first time window, all users on the home network are located. Then, a reset of the passwords may be performed. When a connection is lost for some reason, the resynchronization process is treated as a new set-top box is being added, but the reset is performed on each set-top box. The passwords are resynchronized on the reset. Any set-top box that links to the DVR will be automatically reset. Any set-top box that is isolated, the reset needs to be activated on that set-top box.

The time window must give the user time to go from one room to another if necessary so that the user can communicate in some way to reset that device. The communication may be through a remote control, the pushing of a button on the device or other means. Thus, the reset purpose is to return to the default control parameter, e.g., password, so the devices have a baseline allowing them to talk to each other. Then, the devices share the connection and exchange information to synchronize their timing to obtain the new password. The devices are configured to change to the new password simultaneously so the service will not be interrupted.

When a box 1030 is added, the subscriber accesses a user interface, e.g., on a MR-DVR, that allows the subscriber to give the command for adding a box 1030. All the boxes 1010, 1020, 1022, 1030 are configured with a reset mechanism 1012, 1026, 1028, 1032. An MR-DVR box 1010 has a resynchronization mechanism 1014 for initiating resynchronization. Non-DVR 1020, 1022 do not need a resynchronization mechanism because nobody intends to access content from the non-DVR 1020, 1022, i.e., the non-DVR 1020, 1022 does not store content. Thus, all the boxes 1010, 1020, 1022, 1030 have a reset mechanism 1012, 1026, 1028, 1032 and only MR-DVR box 1010 has both a reset 1012 and a resynchronization mechanism 1014. As mentioned, these buttons may be implemented as a physical buttons, implemented in software, or implemented in some other manner. Each box may have access to a display for presenting a user interface for that box to the user. The user could perform the reset remotely if the box has a connection. However, the primary function of the reset processes is to allow the user to reset the boxes when the connection has been loss.

All the boxes have a default password, and the default password give the boxes a baseline communication. To change the boxes to a uniquely selected password, the reset mechanism 1012 is activated at an MR-DVR box 1010. The time window gives the user sufficient time to activate the reset mechanism on the other boxes 1020, 1022, 1030. However, when the new box 1030 is added, the new box 1030 is connected to the network 1040. However, the new box 1030 cannot communicate with the other boxes 1010, 1020, 1022 yet because the new box 1030 is the only one set with the default password. The new box 1030 cannot receive content because it is not properly isolated and thus has no connection, even though the new box 1030 is configured with the default password. So, all boxes 1010, 1020, 1022 are reset to the default password first. When the boxes are resynchronized, all the boxes will be configured with the unique password and will thus be able to communicate.

A longer time window occurs when the connection is lost. In this case, the first step is to reset all the boxes 1010, 1020, 1022. For example, if a box 1020 is still configured with the unique password and connected to the network, i.e., the MR-DVR 1010 can see this box 1020, the user can reset these boxes 1020 from the MR-DVR 1010. However, the user must move to any other box 1022 because this box 1022 does not have a connection and cannot be reset from the MR-DVR 1010. Thus, the time window is set up so the user has time to reset the boxes that are not connected to the network 1040, i.e., box 1022 in this example. The time window may be configurable by the user.

When a box 1022 loses a connection with the other boxes 1010, 1020 and the user is at that box 1022, the user may be able to send a signal that allows the other boxes 1010, 1020 to reset to the default password. However, since this box 1022 has lost its connection with the other boxes 1010, 1020, such a technique would be dependent on the headend. Because the connection between this box 1022 and all of the other boxes 1010, 1020 has been lost, a path is needed to the other boxes 1010, 1020. Thus, communicating with the headend is an option. Nevertheless, the reset and resynchronization discussed above do not require a headend. When a connection with a headend exists, password management may be handled on the headend. Thus, without using headend, there is no way for the user to work from the box 1022 that has lost its connection to communicate to the other boxes 1010, 1022 to have them reset their passwords. The user must move back and forth between a box 1022 that has lost its connection and the other boxes 1010, 1020.

Even if the connection to the headend is temporarily lost, the subscriber is still authorized to reset the password. For example, where the password is set in the broadband home network, the DSL or the cable modem in the home network may be managed independently from the service provider. This allows features to be setup and the subscriber to manage the network. Still, in most instances the home network will be managed by both the headend and the subscriber thereby providing bi-directional management.

FIGS. 11a-d illustrate the management of content on an MR-DVR 1100 according to an embodiment of the invention. As described above, the trusted rights list is used to manage the storage of DVR content on a Host DVR for viewing on client receivers. However, the implementation of the management of content is not meant to be limited to any single type of configuration. Rather, the trusted rights list may be configured to provide different ways of managing content. Moreover, those skilled in the art will recognize that the methods for managing content described with reference to FIGS. 11a-d are not meant to be exhaustive or limiting.

The trusted rights list allows the storage of one content item with more than one user requesting recording and the recorded item may be recorded with different record options by different users, e.g., pre-roll, delete rules, priority, etc. The recorded list may be viewed with user filtering including filtering the list in a linear list of files or grouped according to folders. Moreover, the content list is viewable by an UPnP client that is not a STB provided by the service provider.

Figure 11A:
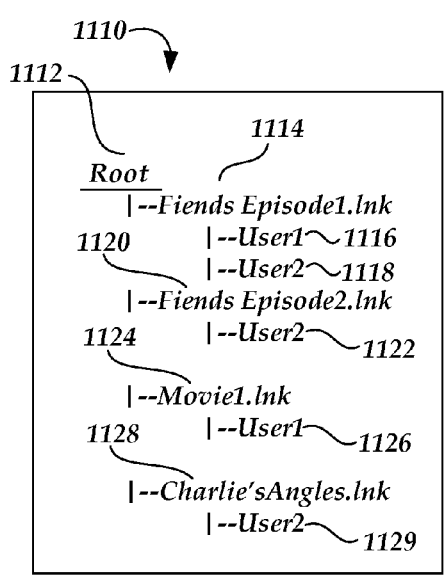
FIGS. 11a-d illustrate the management of content on an MR-DVR according to an embodiment of the invention.

To only maintain one actual recording of a program, but allow more than one user to have an interest or link to it, the relationship and management of the data must be controlled. FIG. 11a shows a first method 1110 for providing enhanced metadata that is attached to the recording. For example, the metadata that contains the program name etc. may also be used to hold information on the users that have requested, viewed or deleted the event. Therefore, FIG. 11a shows the root directory 1112 that includes a folder for Episode1 of Fiends 1114. Episode1 of Fiends 1114 has been recorded by User1 1116 and User2 1118. Episode2 of Fiends 1120 was recorded only by User2 1122. Movies1 1124 was recorded by User1 1126. Charlie's Angles 1128 was recorded by User2 1129. Thus, the first method 1110 shown in FIG. 11a has the advantage of only one file is need to manage each recording. However, this arrangement does not help with UPnP display in the future. Further, all files need to be processed to build a display tree, which may take a long time and may produce no results.

Figure 11B:
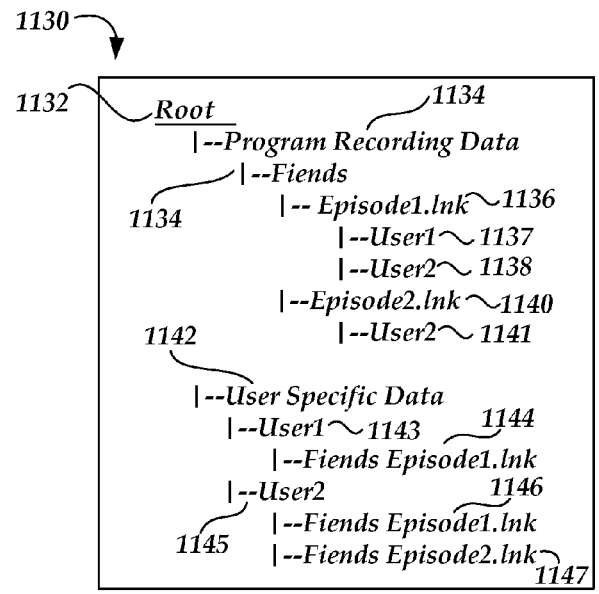

FIG. 11b illustrates a second method 1130 for managing content according to an embodiment of the invention. In FIG. 11b, the metadata may be provided with a symbolic link to the user metadata. FIG. 11b shows the root directory 1132 includes a folder for Program Recording Data 1134 and a folder for User Specific Data 1142. Program Recording Data 1134 shows Episode1 1136 of Fiends 1134 has been recorded by User1 1137 and User2 1138. Episode2 1140 of Fiends 1134 was recorded only by User2 1141. The User Specific Data 1142 shows data specific to User 1 1143. User1 recorded Episode1 of Fiends 1144. Separately, the User Specific Data 1142 shows data specific to User2 1145. User2 1145 recorded Episode1 of Fiends 1146 and Episode2 of Fiends 1147

Thus, FIG. 11b shows how the metadata may be split between common recording information and user specific data. The user specific data may be placed in a directory structure that allows easy navigating of the user's content. This method makes a recording request and linking it to content a simple procedure and simplifies the handling of user metadata. However, multiple files and links are needed to manage each recording. Further, this arrangement does not help with UPnP display in the future. Also, all files need to be processed to build a display tree that may produce in no results.

Figure 11C:
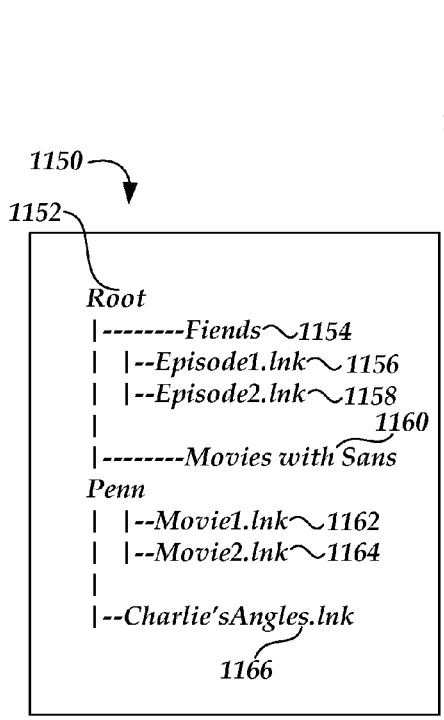

FIG. 11c illustrates a third method 1150 for managing content according to an embodiment of the invention. In FIG. 11c, user metadata is organized for quick display by program centric organization. In the root directory 1152, a folder for Fiends 1154 is provided. The Fiends folder 1154 includes links for two episodes 1156, 1158. Also under the root directory 1152 is a folder for Movies with Sans Pen 1160. In the folder for Movies with Sans Pen 1160, two links to movies 1162, 1164 are provided. A Charlie's Angles link 1166 is also provided under the root directory 1152. With the user metadata separated, the data may be ordered by user or by grouping. This option helps with UPnP display in the future by providing a view structure and makes a recording request and linking it to content simple. Further, the handling of user metadata on pre-roll is simplified. However, multiple files and links still need to be managed for each recording. Also, all files need to be processed to build a display tree that may produce in no results.

Figure 11D:
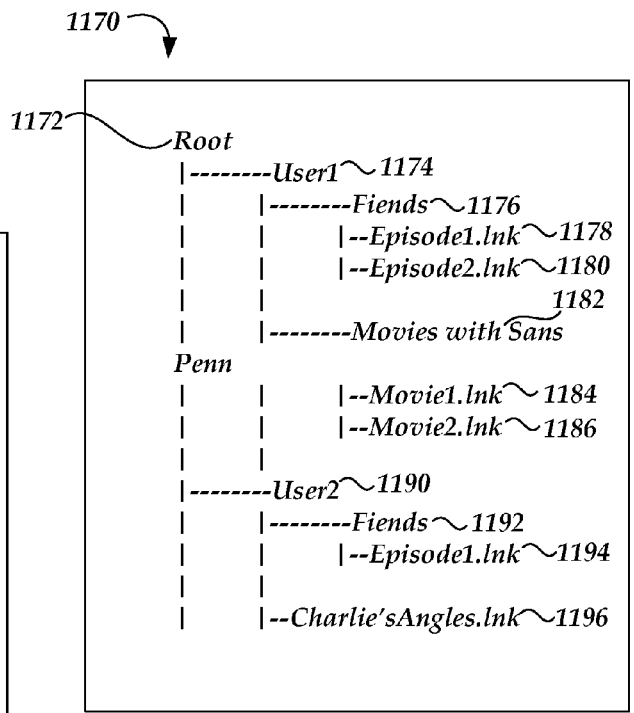

FIG. 11d illustrates a fourth method 1170 for managing content according to an embodiment of the invention. In FIG. 11d, user metadata may be organized for quick display by user centric organization. FIG. 11d shows a root directory having two branches or folders, User1 1174 and User 1190. Under User1 1174, folders for Fiends 1176 and Movies with Sans Penn 1182 are provided. Under the Fiends folder 1176, User1 1174 has recorded two Episodes 1178, 1180. Under Movies with Sans Penn 1182, the user has recorded two movies 1184, 1186. Under User2 1190, the folder for Fiends 1192 includes a link for only the first Episode 1194. However, User2 1190 has also recorded Charlie's Angles 1196. Again, the separation of the user metadata allows the data to be ordered by user or by grouping. As shown in FIG. 11d, the program metadata may be stored in a user based directory structure with the metadata then stored in a program centric way under the user directory. This option helps with UPnP display in the future by providing a view structure. All files do not need to be processed to build display tree, which may produce a quicker response. The making of a recording request and linking it to content is simple. Further, the handling of user metadata on a pre-roll case is simplified. However, multiple files and links are still needed to manage each recording. Also, for the user default, more searching is required.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A master multi-room digital video recorder (MR-DVR), comprising:
   memory for storing data; and
   a processor, coupled to the memory, for providing capture and presentation of content, for providing a trusted rights list including a network control parameter for controlling device access, for running applications, the applications controlled solely by a service provider, and for providing gateway management of transmission of content and the trusted rights list between the service provider and additional set top box devices (STBs), the processor provisioning an interface for managing the network control parameter, the interface providing communication with additional STBs to reset the network control parameter for the STBs in communication with the MR-DVR and to coordinate management of the network control parameter between the MR-DVR and STBs.

2. The MR-DVR of claim 1, wherein the network control parameter comprises a password, the interface enabling a user to reset the password to all STBs to a default value.

3. The MR-DVR of claim 1, wherein the network control parameter comprises a password, the interface enabling a user to synchronize the setting of the password on the STBs to a new value.

4. The MR-DVR of claim 1, wherein the processor provides features associated with the capture and presentation of the content, the features configured for enablement and disablement from a headend.

5. A multi-room media network, comprising:
a network for providing device interconnectivity for receiving and sending data;
and a plurality of content control devices coupled to the network, wherein the plurality of content control devices include:
a master multi-room digital video recorder (MR-DVR) for providing for capture and presentation of content received by the network, for running applications, the applications controlled solely by a service provider, for providing a trusted rights list including a control parameter for controlling device access, and for providing gateway management of transmission of the content and the trusted rights list between the service provider and additional non-DVR devices; and
at least one non-DVR device, coupled to the MR-DVR, the at least one non-DVR device configured to communicate with the MR-DVR, wherein the at least one non-DVR device includes a reset interface for resetting a the control parameter on the at least one non-DVR device to a default value, the MR-DVR includes a reset interface for resetting a control parameter on the MR-DVR and for resetting any of the at least one non-DVR device in communication with the MR-DVR to a default value, the MR-DVR further including a resynchronization interface for initiating a setting of the control parameter on the MR- DVR and the at least one non-DVR to a new value after the control parameter for the MR-DVR and the at least one non-DVR has been reset.

6. The multi-room media network of claim 5, wherein the MR-DVR communicates with other devices coupled to the network.

7. The multi-room media network of claim 5, wherein a time window is set for accessing the reset interface of a device to communicate a reset of the control parameter for the plurality of content control devices.

8. The multi-room media network of claim 5, wherein the resynchronization interface causes the plurality of content control devices to exchange information for synchronizing to a new password.

9. The multi-room media network of claim 5, wherein the reset interface sets a default password for each of the plurality of content control devices.

10. The multi-room media network of claim 9, wherein all of the plurality of content control devices are able to communicate when the default password has been set on each of the plurality of content control devices.

11. The multi-room media network of claim 8, wherein the plurality of content control devices change to the new password simultaneously.

12. The multi-room media network of claim 9, wherein the plurality of content control devices are reset to a default password when a new content control device is added to the network.

13. The multi-room media network of claim 5, wherein, when a non- DVR loses connection with the MR-DVR, all content control devices not losing a connection with the MR-DVR have the control parameter reset at the MR-DVR by activating the reset interface at the MR-DVR.

14. The multi-room media network of claim 13, wherein, when a non- DVR loses connection with the MR-DVR, all content control devices losing a connection with the MR-DVR are reset by manually activating the reset interface at the plurality of content control devices that lost a connection with the MR-DVR.

15. A method for providing a multi-room media network, comprising:
providing a network for establishing device interconnectivity for receiving and sending data;
providing a plurality of content control devices coupled to the network, wherein the providing of the plurality of content control devices include providing a master multi-room digital video recorder (MR-DVR) to capture and present content received by the network, to run applications, the applications controlled solely by a service provider, to provide a trusted rights list including a control parameter for controlling device access, and to provide gateway management of transmission of content and the trusted rights list between the service provider and non-DVR devices, and providing at least one non-DVR device coupled to the MR-DVR to communicate with the M R-DVR; providing the plurality of content control devices with a reset interface for resetting the control parameter on the at least one non-DVR device to a default value; and
providing the MR-DVR a resynchronization interface for resetting the control parameter on the MR-DVR and for resetting any of the at least one non-DVR device in communication with the MR-DVR to a default value and for setting the control parameter on the plurality of content control devices after the control parameter for the plurality of content control devices has been reset.

16. The method of claim 15 further comprising communicating with other devices coupled to the network and setting a time window for accessing the reset interface of a device to communicate a reset of the control parameter for the plurality of content control device.

17. The method of claim 15 further comprising causing the plurality of content control devices to exchange information for synchronizing to a new password.

18. The method of claim 15 further comprising setting a default password for each of the plurality of content control devices, wherein all of the plurality of content control devices are able to communicate when the default password has been set on each of the plurality of content control devices.

19. The method of claim 18 further comprising resetting the plurality of content control devices to a default password when a new content control device is added to the network.

20. The method of claim 15 further comprising resetting at the MR-DVR all content control devices not losing a connection with the MR-DVR when a non-DVR loses connection with the MR-DVR by activating the reset interface at the MR-DVR, and resetting all content control devices losing a connection with the MR-DVR when a non-DVR loses connection with the MR-DVR by manually activating the reset interface at the content control devices that lost a connection with the MR-DVR.

21. A non-transitory computer-readable storage medium having stored thereon computer-executable instructions for implementing a multi-room media network, the computer-executable instructions, when executed by a computer, cause the computer to:
establish a network for establishing device interconnectivity for receiving and sending data;
configure a plurality of content control devices coupled to the network, wherein providing the plurality of content control devices include configuring a master multi-room digital video recorder (MR-DVR) to capture and present content received by the network, to run applications, the applications controlled solely by a service provider, to provide a trusted rights list including a control parameter for controlling device access, and to provide gateway management of transmission of content and the trusted rights list between the service provider and non-DVR devices, and configuring at least one non-DVR device coupled to the MR-DVR to communicate with the MR-DVR;

create a reset interface for the plurality of content control devices for resetting the control parameter on the at least one non-DVR device to a default value; and create a reset interface for resetting the control parameter on the MR-DVR and for resetting any of the at least one non-DVR device in communication with the MR-DVR to a default value and a resynchronization interface for the MR-DVR for initiating a setting of the control parameter on the plurality of content control devices after the control parameter for the plurality of content control devices has been reset.

22. The MR-DVR of claim 1, wherein the interface displays a time window for displaying a timer counting down to reset of the network control parameter.

23. The MR-DVR of claim 1, wherein the interface further includes a button for resetting the network control parameter.

24. The MR-DVR of claim 23, wherein the button is a hardware button.

25. The MR-DVR of claim 23, wherein the button is a software button presented on the interface.

26. The MR-DVR of claim 2, wherein the control parameter comprises no characters by default.

27. The MR-DVR of claim 5, wherein the resynchronization interface displays a time window for displaying a timer counting down to a time when resynchronization of the control parameter is to occur.

28. The MR-DVR of claim 9, wherein the at least one non-DVR device includes a reset interface further includes a button for resetting the control parameter to a default password.

29. The MR-DVR of claim 28, wherein the button is a hardware button.

30. The MR-DVR of claim 28, wherein the button is a software button presented on the reset interface.

31. The MR-DVR of claim 28, wherein the default password comprises no characters.

* * * * *